United States Patent [19]

Nerone et al.

[11] Patent Number: 5,144,204

[45] Date of Patent: Sep. 1, 1992

[54] TAPPED-INDUCTOR BOOST CONVERTOR FOR OPERATING A GAS DISCHARGE LAMP

[75] Inventors: Louis R. Nerone, Brecksville; John G. Basch, Westlake, both of Ohio

[73] Assignee: General Electric Company, Schenectady, N.Y.

[21] Appl. No.: 705,854

[22] Filed: May 28, 1991

[51] Int. Cl.$^5$ ............... H05B 37/00; H05B 39/00; H05B 41/14
[52] U.S. Cl. ............... 315/209 R; 315/219; 315/200 R; 315/244; 315/241 R
[58] Field of Search ............ 315/209 R, DIG. 7, 219, 315/241 R, 243, 244, 290, 200 R, 205; 363/13

[56] References Cited

U.S. PATENT DOCUMENTS 4,201,949  5/1980  Robbins ............... 315/219

*Primary Examiner*—Eugene R. LaRoche
*Assistant Examiner*—Michael B. Shingleton
*Attorney, Agent, or Firm*—George E. Hawranko; Stanley C. Corwin; Fred Jacob

[57] ABSTRACT

An improved tapped-inductor boost converter for operating a gas discharge lamp is disclosed. The converter includes a pair of input terminals connected to a power source supplying an input voltage, a pair of output terminals for providing an output voltage greater than or equal to the input voltage to the lamp, or other load, a tapped-inductor having first and second windings, an active switch for controlling current flow through the first winding for variably controlling the output voltage, a passive switch for controlling current flow through the second winding, and a first capacitor. The converter further includes an arrangement for varying the clamping voltage at the active switch in response to variations in the output voltage and also includes a clamping capacitor for transferring energy stored in the leakage inductance of the tapped-inductor to the load for improved efficiency. In the preferred embodiment, the first and clamping capacitors are interconnected to form a first filter, and the converter includes a second filter connected to one of the output terminals. The respective time constants of the first and second filters are predetermined for obtaining relatively high lamp ripple current during the run mode of the lamp, and relatively low lamp ripple current during the start mode of the lamp.

17 Claims, 1 Drawing Sheet

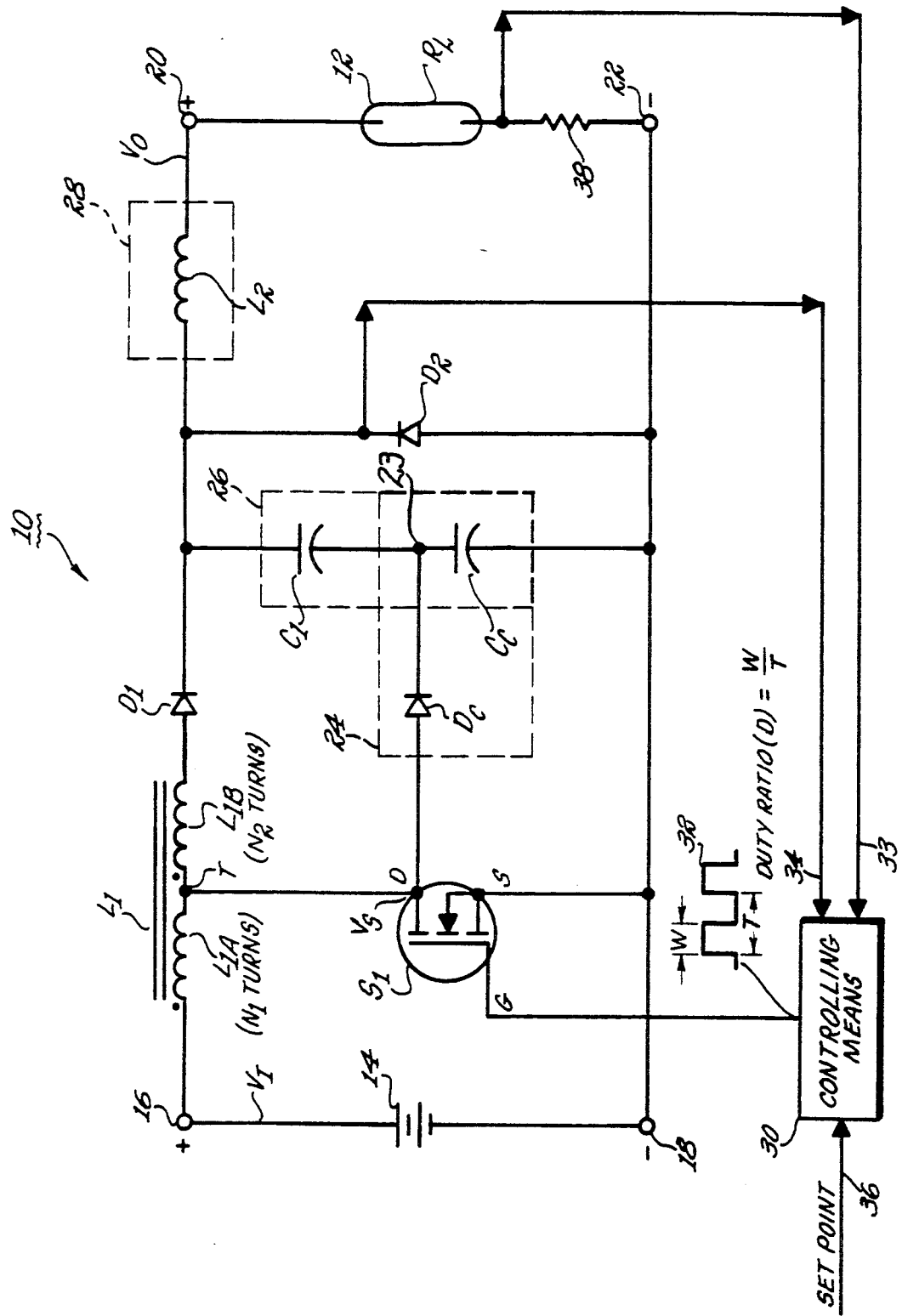

TAPPED-INDUCTOR BOOST CONVERTOR FOR OPERATING A GAS DISCHARGE LAMP

TECHNICAL FIELD

The present invention relates generally to ballast circuits for operating gas discharge lamps, and, more specifically, to an improved tapped-inductor boost converter for operating a gas discharge lamp from a DC power source.

BACKGROUND ART

Gas discharge lamps are being considered for use in automobiles by automotive designers so as to allow for lowering the hood lines of the automobile in order to improve the appearance and aerodynamic performance of the automobile. Gas discharge lamps such as a xenon lamp, metal halide lamp and xenon-metal halide lamp do not include filaments, but instead typically include two electrodes inside a quartz enclosure filled with selected ingredients. It is preferred that the selected ingredients include xenon, which provides for the instant light needs of the automobile. During a start mode, or warm-up mode, of the lamp, an arc is created across the electrodes for generating light. After the start mode, the lamp is then sequenced into a run mode wherein it is operated continuously. In both the start mode and the run mode, the lamp's arc must be controlled to avoid instability which could degrade performance and life of the lamp during operation. The instability is primarily manifested by a bowed arc condition between the electrodes of the lamp.

In an automotive application of a gas discharge lamp, the power requirements for the lamp may vary, for example, from about 30 watts during the run mode to about 110 watts during the start mode. The transition from the start mode to the run mode results in an equivalent lamp resistance which varies widely.

Accordingly, the ballast for operating the lamp must be effective for operating over such range of output power while avoiding instability of the arc.

For providing the increased voltage needed for effectively operating the gas discharge lamp, a ballast in the form of a DC-to-DC converter connected in circuit with the usual automotive battery can be used. One type of DC-to-DC converter usable for this purpose is the tapped-inductor boost converter. A conventional tapped-inductor boost converter includes a pair of input terminals capable of being connected to a DC power source serving as its input voltage, a pair of output terminals for providing an output voltage greater than the input voltage to a load, a tapped-inductor having first and second windings and a tap between said windings, an active switch connected to the tap and cyclically operable with a varying duty cycle for controlling current flow through the first winding and thereby variably controlling the output voltage, a passive switch for controlling current flow through the second winding, and a filter capacitor for controlling the ripple component of the output voltage.

The term "active switch" as used herein is intended to denote a switching device, the conduction of which is controlled by an external signal. The term "passive switch" as used herein is intended to denote a switching device, the conduction of which ceases when its current reaches zero or reverses polarity. The active switch typically includes a transistor, and the passive switch typically include a diode.

A conventional tapped-inductor boost converter would be unacceptable for use in operating a gas discharge lamp such as a metal halide lamp, since the resistance of the metal halide lamp varies during the start and run modes, and the output ripple current of the conventional converter would hinder the desired operation of the discharge lamp. More specifically, during the run mode, a lamp current with a relatively high percentage ripple content is desired for maintaining arc stability of the lamp; and during the start mode, a lamp current with a relatively low percentage ripple content is desired for maintaining arc stability. But in a conventional boost converter applied to operate a gas discharge lamp, the converter develops in its output current a percentage ripple content opposite to that which is desired, with a relatively high percentage ripple content being developed during the start mode, and a relatively low percentage ripple content being developed during the run mode due to the dynamics of the capacitive type output filter which is typically present. Furthermore, in a conventional boost converter the capacitive type output filter operates in a manner which could possible damage the lamp during the transition period from start to run.

In the operation of a gas discharge lamp in an automotive application, a relatively high output power ranging from about 30 watts to about 110 watts, for example, is required from the converter. Operation at this relatively high power tends to impose a relatively large voltage stress across the active switch arranged within the converter. This stress is created by the energy stored in the leakage inductance of the tapped-inductor being discharged into the active switch when the active switch is rendered non-conductive, or opened. A relatively expensive active switch, therefore, would have to be used to accommodate the voltage stress, which would result in a more expensive converter. Alternatively, conventional snubbers could be used to dissipate the energy imposed upon the active switch by discharge of the leakage inductance, but such snubbers are typically inefficient and reduce the overall efficiency of the ballast significantly.

OBJECTS OF THE INVENTION

Accordingly, one object of the present invention is to provide a new and improved tapped-inductor boost converter which is especially effective for serving as a ballast circuit for operating gas discharge lamps.

Another object of the present invention is to provide a tapped-inductor boost converter having reduced voltage stress on the active switch thereof.

Another object of the invention is to provide a tapped-inductor boost converter with a voltage clamp that acts not only to protect the active switch from voltage stress but also to improve the efficiency of the converter.

Another object of the present invention is to provide a tapped-inductor boost converter operable to develop varying output power in a range especially suitable for gas discharge lamp operation.

Another object of the present invention is to provide a tapped-inductor boost converter for gas discharge lamp operation that is effective to provide a lamp current having a relatively high percentage ripple content for obtaining arc stability during the run mode of the lamp.

Another object is to provide for gas discharge lamp operation a tapped-inductor boost converter that is effective for providing a lamp current with a relatively high percentage ripple content during the run mode of the lamp and a relatively low percentage ripple content during the start mode of the lamp.

SUMMARY OF THE INVENTION

In carrying out the invention in one form, an improved tapped-inductor boost converter serving as a ballast circuit for operating a gas discharge lamp is provided. The converter includes a pair of input terminals capable of being connected to a DC power source serving as its input voltage, a pair of output terminals for providing an output voltage greater than the input voltage to the lamp, a tapped-inductor having first and second windings and a tap between said windings, an active switch connected to the tap and operable with a varying duty ratio for controlling current flow through the first winding and thereby variably controlling the output voltage, and a passive switch for directing current flow through the second winding and said output terminals.

The improved converter includes means for varying the clamping voltage at the active switch in response to variations in the output voltage. This means for varying the clamping voltage comprises a capacitive voltage divider connected in parallel with the output terminals across which the output voltage is developed. The voltage divider comprises the series combination of a clamping capacitor and another capacitor, and means for connecting the clamping capacitor across the active switch. The thus-connected clamping capacitor acts to absorb energy stored in the leakage inductance of the tapped inductor and to transfer this energy to the load for improved efficiency. The voltage divider also acts as a first output filter, which cooperates with a second output filter in the form of an inductance connected to one of the output terminals. The respective time constants of the first and second filters are predetermined so as to obtain lamp current with a relatively high percentage ripple content during the run mode of the lamp and with a relatively low percentage ripple content during the start mode of the lamp.

BRIEF DESCRIPTION OF DRAWINGS

The novel features believed characteristic of the invention are set forth and differentiated in the claims. The invention, in accordance with a preferred, exemplary embodiment, together with further objects and advantages thereof, is more particularly described in the following detailed description taken in conjunction with the accompanying drawing in which:

The single FIGURE is a schematic representation of an improved tapped-inductor boost converter in accordance with one embodiment of the present invention.

DETAILED DESCRIPTION OF A PREFERRED EMBODIMENT

Illustrated in FIG. 1 is a tapped-inductor boost converter 10, or ballast 10, for operating a gas discharge lamp 12 such as a metal halide lamp, from a conventional DC power source 14 such as, for example, an automotive battery having an output voltage $V_1$ nominally of 14 volts DC. The converter 10 includes a pair of input terminals 16 and 18 connected respectively to the positive and negative terminals of the power source 14. The converter 10 also includes a pair of positive and negative output terminals 20 and 22, respectively, connected to the lamp 12 for providing an output voltage $V_o$, with the output voltage $V_o$ being greater than or equal to the input voltage $V_1$ provided to the input terminals by the power source 14. The negative output terminal 22 is connected to the negative input terminal 18 so as to provide a common reference for ballast 10.

The converter 10 further includes a conventional tapped-inductor designated $L_1$ comprising a first winding designated $L_{1A}$ having $N_1$ turns, and a second winding designated $L_{1B}$ having $N_2$ turns, which windings are mutually electromagnetically coupled about a conventional core. Between the windings is a tap T. An active switch $S_1$, such as a conventional MOSFET, has (i) its drain electrode D connected to the tap T of $L_1$ and has thereon the switch voltage $V_S$, (2) its source, or input, electrode S connected to input terminal 18, and (3) its gate electrode G connected to an external control means to be discussed hereinafter. Although a MOSFET is disclosed for the preferred embodiment, other suitable conventional types of active switches may also be used. The active switch $S_1$ is cyclically rendered conductive and non-conductive in a predetermined fashion (soon to be described in more detail) to control the current flow through the first winding $L_{1A}$, thereby variably controlling the output voltage $V_o$. A passive switch, such as a first diode $D_1$ is connected in series with the second winding $L_{1B}$ for directing current flow through the second winding $L_{1B}$ to the output filters (soon to be described) and load 12. In operation, when the active switch $S_1$ is not conducting, the first diode $D_1$ conducts, so as to allow current flow from the second winding $L_{1B}$ to be directed to the positive output terminal 20. Conversely, when the active switch $S_1$ is conducting, the first diode $D_1$ is non-conducting.

The cathode of diode $D_1$ is connected to one end of capacitor $C_1$ which has its other end connected to a node 23 located between diode $D_c$ and capacitor $C_c$, which together form clamping means 24, as shown in the drawing. The capacitors $C_1$ and $C_c$ are serially connected through the node 23 therebetween. The capacitors $C_1$ and $C_c$ also form a first filter 26. The clamping diode $D_c$ has its cathode connected to said node 23 and its anode connected to the tap (T) of inductor $L_1$. The cathode of diode $D_1$ is also connected to a first end of a second filter 28 comprised of inductor $L_2$ which has its second end connected to output terminal 20. The cathode of diode $D_1$ is further connected to the cathode of a fill diode $D_2$ which has its anode connected to output terminal 22.

Clamping means 24 varies the switch, or clamping, voltage $V_S$ at the active switch $S_1$ in response to variations in the output voltage $V_O$. The clamping means 24 provides two substantial benefits. Firstly, it provides a non-dissipative clamp for clamping the switch voltage $V_S$ while also providing a path from the tapped-inductor $L_1$ for channeling energy to the clamping capacitor $C_c$ wherein it is temporarily stored while the active switch $S_1$ is open, or non-conducting. When the active switch $S_1$ is closed, or rendered conducting, this additional energy stored in the clamping capacitor $C_c$ is transferred to the load or lamp 12 and is therefore not wasted. In other words, the clamping means 24 is a non-dissipative clamp effective for transferring the energy stored in the leakage inductance of the tapped-inductor $L_1$ to the lamp 12. Secondly, the series-connected first and clamping capacitors $C_1$ and $C_c$ constitute a split capacitor serving as a capacitive divider having an equivalent capacitance $C_{eq}$ which is equal to $C_1C_c/(C_1+C_c)$ and acting as the first filter 26 of the converter 10.

The clamping means 24 is able to vary the clamping voltage $V_s$ on the active switch in response to variations in the output voltage $V_o$ because the clamping capacitor $C_c$ is part of a voltage divider connected in parallel with the output terminals 20, 22. As a result, the voltage appearing across the capacitor $C_c$ will vary generally as a direct function of the output voltage $V_o$ between the terminals.

When the load 12 is a gas discharge lamp, for example, it has a resistance $R_L$. Although the lamp 12 includes two electrodes for generating an arc, it is schematically represented in FIG. 1 by its equivalent resistance $R_L$. The lamp resistance $R_L$ is not constant and in the run mode has a value $R_L{}^r$ which is relatively high and in one embodiment is about 67 ohms. The first filter 26 and the lamp run resistance $R_L{}^r$ provide a first filter time constant for the converter 10 in the run mode designated $T_{F1}{}^r$ which is equal to $R_L{}^rC_{eq}$. The first filter time constant in the run mode $T_{F1}{}^r$ is preselected for obtaining a predeterminedly high percentage ripple content in the current in the lamp 12 in the run mode for controlling arc stability in the lamp 12. More specifically, the lamp current is the current flowing via the output terminals 20, 22 through the lamp 12, and the percentage ripple content in this lamp current during a representative interval can be represented by the following expression:

$$100 (I_{max}-I_{min})/2 I_{avg} \qquad (1)$$

where
$I_{max}$ = the maximum value of the current,
$I_{min}$ = the minimum value of the current, and
$I_{avg}$ = the average lamp current.

It is to be noted that although the percentage ripple content is less in the start mode than in the run mode, the absolute value of the ripple current, or component, i.e., $I_{max}-I_{min}$ is higher in the start mode than in the run mode, assuming a 50% ripple content in the run mode and a 20% ripple content in the start mode. This can be appreciated by observing that the average start current is typically about 8 times the average run current.

The requirements of the particular lamp 12 that is utilized determine the percentage ripple content required for controlling arc stability. In the preferred embodiment of the present invention, a relatively high percentage ripple content in the run mode is desired for controlling arc stability in the lamp 12, which operates mostly in the run mode. In the start mode, the lamp 12 operates for a relatively short time, which averages several seconds for each start-up. The capacitance values of the capacitor $C_1$ and $C_c$ may be conventionally selected for obtaining the equivalent capacitance $C_{eq}$ which with the value of the lamp resistance in the run mode $R_L{}^r$ determine the first filter time constant in the run mode $T_{F1}{}^r$. For the exemplary embodiment illustrated wherein the lamp 12 is a 30 watt metal halide lamp, the first filter time constant in the run mode $T_{F1}{}^r$ is preferably about 19 times greater than the first filter time constant in the start mode and results in the percentage ripple content in the lamp current during the run mode of approximately 60%.

The converter 10 also preferably includes the second filter 28 for effecting a predeterminedly low percentage ripple content in the lamp current during the start mode of the lamp 12 so as to control the arc stability of the lamp 12. The lamp 12 in the start mode has a start resistance $R_L{}^s$ which is substantially less than the run resistance $R_L{}^r$ and has a value, for example, of about 3.6 ohms (as compared to 67 ohms in the run mode). The value of the second inductor $L_2$ is predeterminedly selected based on the start resistance $R_L{}^s$ of the lamp 12 for effecting a second filter time constant in the start mode $T_{F2}{}^s$ which is equal to $L_2/R_L{}^s$ and which is preselected for obtaining a predeterminedly low percentage ripple content in the lamp current in the start mode. For a metal halide lamp, a predeterminedly low, or minimum, percentage ripple content in the lamp current in the start mode is preferred for preventing arc instability, and, in the one embodiment, is preferably less than about 20%.

Accordingly, the values of $C_1$, $C_c$, and $L_2$ are preselected based on the values of the lamp resistance $R_L$ in the start and run modes for obtaining the preferred first and second filter time constants as above described for obtaining a relatively high and a relatively low percentage of ripple content in the lamp current, in the run and start modes, respectively. Since the value of the lamp resistance changes from the start mode to the run mode, the first and second filter time constants also change from the start mode to the run mode. Accordingly, the first filter time constant $T_{F1}{}^r$ will change from its run mode value $R_L{}^rC_{eq}$ to a different value $T_{F1}{}^s$ in the start mode which is equal to $R_L{}^sC_{eq}$. Similarly, the second filter time constant $T_{F2}{}^s$ will change from its value $L_2/R_L{}^s$ in the start mode to a different value $T_{F2}{}^r$ in the run mode which is equal to $L_2/R_L{}^r$. Also in the preferred embodiment, the ratio of the second filter time constant over the first filter time constant in the start mode, i.e. $T_{F2}{}^s/T_{F1}{}^s$, is about 100, and the ratio of the first filter time constant over the second filter time constant in the run mode, i.e., $T_{F1}{}^r/T_{F2}{}^r$, is about 3. This ensures that the dominant filtering mechanism in the run mode is the split capacitor $C_1$, $C_c$ for ensuring the predetermined relatively high percentage ripple content in the lamp current in the run mode. In the start mode, the dominant filtering mechanism is the second inductor $L_2$ which provides for the predeterminedly low percentage ripple content in the lamp current during the start mode.

The converter 10 in the preferred embodiment further includes the second, or fill, diode $D_2$ which provides a current path from the negative output terminal 22 to the second inductor $L_2$ so as to reduce the lamp ripple current during the start mode. The fill diode $D_2$ in one embodiment of the invention is effective for further reducing the percentage ripple content in the lamp current during starting below a 20% value to about 10%.

In the preferred embodiment of the present invention, the active switch $S_1$ comprises a conventional N-channel MOSFET. The gating electrode G of switch $S_1$ is connected to controlling means 30 so as to provide for selectively varying the output voltage $V_O$ for operating the lamp 12 from the start mode to the run mode. The controlling means 30 preferably provides a square-wave voltage signal 32 having a predetermined switching frequency and variable duty ratio (D) for controlling the output voltage $V_O$ and output power provided to the lamp 12. The variable duty ratio D represents the portion W/T of one period (T) of the square-wave voltage signal 32 during which the active switch $S_1$ is conductive. The output voltage $V_O$ is related to the input voltage $V_I$ in this embodiment as follows:

$$V_O/V_I = (1+ND)/(1-D) \quad (2)$$

wherein N represents $N_2/N_1$.

In the preferred embodiment, the value of N is 2, and the output voltage $V_O$ ranges from about 20 volts to about 45 volts corresponding with output power to the lamp 12 ranging from about 110 watts to about 30 watts, which, in turn, correspond to the percentage ripple content of the lamp current ranging from about 20% to about 60% corresponding with the start and run modes, respectively. The switching frequency of the controlling means 30 is preferably about 100 kHz and may range in alternate embodiments up to about 200 kHz wherein it is conventionally limited by output efficiency, size, and effective heat dissipation of the active switch $S_1$.

Since the converter 10 when used for operating the gas discharge lamp 12 operates over a relatively large output power range, ranging from about 30 watts to about 110 watts, the discharge of energy stored in the leakage inductance of the tapped-inductor $L_1$ when switch $S_1$ is opened during high output power operation would otherwise cause undue voltage stress on the active switch $S_1$ without the use of the clamping means 24. For a conventional ideal tapped-inductor having no leakage, the ideal voltage stress on the MOSFET, in the non-conducting (or open) state, assuming that the current flowing through the winding $L_{1A}$ is continuous, may be represented as follows:

$$V_S = V_I/(1-D) \quad (3)$$

Accordingly, for an ideal, perfectly coupled tapped-inductor without inductance leakage, the ideal voltage stress $V_S$ across the MOSFET when in the non-conductive state has a value proportional to $(1/(1-D))$. In order to keep the voltage stress $V_S$ across the active switch $S_1$ as close to ideal as possible for providing nearly ideal clamping, it is preferred that the first winding turns $N_1$, the first capacitance $C_1$, and the clamping capacitance $C_c$ be related to each other as follows:

$$\frac{C_c}{C_1} = \frac{N_2}{N_1} D = ND \quad (4)$$

Accordingly, the improved tapped-inductor boost converter 10 disclosed above is effective for operating a conventional gas discharge lamp 12 at relatively high values of output power ranging from about 30 watts in the run mode to about 110 watts in the start mode, with corresponding output voltage $V_O$ ranging from about 45 volts to about 20 volts, respectively, and with the percentage ripple content varied as needed to effectively control arc stability of the lamp 12.

The first and second filters 26 and 28 have the first and second time constants associated with the varying resistance of the lamp 12 for obtaining in the lamp current a relatively high percentage ripple content, for example, greater than about 60%, in the predominant run mode of operation of the lamp 12, and a relatively low percentage ripple content, for example, less than about 20%, in the relatively brief starting mode of operation of the lamp 12. Arc stability of the lamp 12 is thusly maintained, and efficiency of the converter 10 is relatively high since energy stored in the leakage inductance of the tapped-inductor $L_1$ is transferred to the lamp 12 through the clamping diode $D_c$ and the clamping capacitor $C_c$. The clamping means 24 in the preferred embodiment provides nearly ideal clamping of the voltage stress $V_S$ on the active switch $S_1$ by varying $V_S$ in response to the variations in output voltage $V_O$.

The controller 30, the details of which are not a part of the present invention, is preferably of the basic form shown in U.S. Pat. No. 4,928,038 to Nerone, assigned to the assignee of the present invention. In the illustrated schematic showing, the controller 30 is fed with three input quantities via channels 33, 34, and 36, respectively. Through the input channel 33 a voltage signal representative of the current through the lamp 12 is fed, this signal being derived from the IR drop across a sensing resistor 38 in series with the lamp 12. Through the input channel 34 a voltage signal representative of the voltage across the lamp is fed. The controller 30 utilizes the voltage and current information fed through channels 33 and 34 to sense the actual power through the lamp. Through the third channel 36, a set point signal representative of the desired power through the lamp is fed to the controller. The controller 30 provides in its output 32 a duty ratio D corresponding to that called for by the set point signal. Should the actual power through the lamp, as determined from the voltage and current information supplied via channels 33 and 34, differ from the power called for by the set point signal, an error signal is developed within the controller to cause the controller to adjust the duty ratio by an amount sufficient to force the actual power to correspond to the power called for by the set point signal. The set point signal has a predetermined value for the start mode (dependent upon how long the lamp has been off immediately preceding lamp start-up) and another predetermined value for the run mode.

By way of example and not limitation, a typical circuit embodying our invention in one form has employed components of the following values or types:

| | |
|---|---|
| Winding $L_1A$ | 80 microhenries |
| Winding $L_1B$ | 320 microhenries |
| $N_2/N_1$ | 2 |
| Switch $S_1$ | Type IRFP150 MOSFET |
| Diode $D_1$ | Type BYV29 - 300 |
| Diode $D_c$ | Type BYD74D |
| Capacitor $C_1$ | 0.10 microfarads |
| Capacitor $C_c$ | 0.22 mcrofarads |
| Diode $D_2$ | Type BYD 746 |
| Inductor $L_2$ | 100 microhenries |
| Sensing resistor 38 | 0.15 ohms |
| Lamp 12 | a 30 watt d.c. metal halide discharge lamp |

While there has been described herein what is considered to be a preferred embodiment of the present invention, other modifications of the invention shall be apparent to those skilled in the art from the teachings herein and it is, therefore, desired to be secured in the appended claims all such modifications as fall within the true spirit and scope of the invention.

Accordingly, what is desired to be secured by Letters Patent of the United States is the invention as defined and differentiated in the following claims:

What we claim as new and desire to secure by Letters Patent of the United States is:

1. In a tapped-inductor boost converter having a pair of input terminals connected to a power source capable of providing a DC input voltage thereto and a pair of output terminals for providing a gas discharge lamp an output voltage greater than or equal to the input voltage, said converter further comprises:

an inductor comprising first and second windings and a tap between said windings;

an active switch member connected to said tap;

means for controlling and cyclically rendering said active switch conductive and non-conductive in a manner such that current flow through said first winding is effectively controlled thereby and further, such that said output voltage is also variably controlled thereby;

a passive switch coupled to said inductor and effective such that, current through said second winding is controlled thereby;

means for filtering said output voltage;

clamping means cooperatively associated with said output filtering means and receptive of a signal which is proportionate to said output voltage, said clamping means being effective for clamping voltage being variable as a function of variations in said output voltage across said active switch member, said clamping voltage being variable as a function of variations in said output voltage, said clamping means including a clamping diode and a clamping capacitor and being further effective so that energy stored in the leakage inductance of said inductor is transferred to said gas discharge lamp thereby.

2. A tapped-inductor boost converter according to claim 1 wherein:

said passive switch comprises a undirectionally conducting device having an anode and a cathode, said output filtering means is a capacitive voltage divider comprising a first capacitor $C_1$, a clamping capacitor $C_c$, and means for serially connecting together one end of each of said capacitors and forming a node therebetween, the other end of said capacitor $C_1$ connected to the cathode of said passive switch and the other end of said capacitor $C_c$ connected to one of said output terminals; and said clamping diode having a cathode and an anode, and means connecting the latter cathode to said node and the latter anode to said tap.

3. A tapped-inductor boost converter according to claim 2 wherein:

said gas discharge lamp has a run resistance in the run mode $R_L^r$;

said capacitive divider has an equivalent capacitance $C_{eq}$;

said converter has a first time constant in said run mode $T_{F1}^r$ equal to $R_L^r C_{eq}$; and said first time constant in said run mode $T_{F1}^r$ is preselected for obtaining a predeterminedly high percentage ripple content in the lamp current mode in comparison to the percentage ripple content in the lamp current during the start mode of the lamp.

4. A tapped-inductor boost converter according to claim 3 further including a second filter connected between said passive switch and one of said output terminals for reducing the percentage ripple content in said lamp current during the start mode of said lamp to control the arc stability of said lamp during starting.

5. A tapped-inductor boost converter according to claim 4 wherein:

said second filter comprises an inductor $L_2$;

said lamp has a start resistance in said start mode $R_L^s$ which is less than $R_L^r$; and said converter has a second filter time constant in said start mode $T_{F2}^s$ which is preselected for obtaining a predeterminedly low percentage ripple content in said lamp current during said start mode.

6. A tapped-inductor boost converter according to claim 5 further including a fill diode connected from one of said output terminals to said second inductor for providing a current path to reduce the percentage ripple content in the lamp current during said start mode.

7. A tapped-inductor boost converter according to claim 3 wherein said passive switch comprises a diode.

8. A tapped-inductor boost converter according to claim 1 wherein said active switch comprises a MOSFET.

9. A tapped-inductor boost convertor according to claim 1 wherein said active switch is cyclically rendered conductive and non-conductive at a predetermined switching frequency and with a variable duty ratio D that determines said output voltage, said duty ratio D being the portion of each cycle that said active switch is conductive.

10. A tapped-inductor boost converter according to claim 9 wherein:

said first winding has $N_1$ turns;

said second winding has $N_2$ turns;

said first capacitor has a capacitance $C_1$;

said clamping capacitor has a capacitance $C_c$; and $N_1$, $N_2$, $C_1$, and $C_c$ are predeterminedly related for maintaining a voltage stress $V_s$ across said active switch when said active switch is rendered non-conductive of approximately $$\frac{N_2}{N_1} D.$$

11. A tapped-inductor boost converter according to claim 10 wherein D, $N_1$, $N_2$, $C_1$, and $C_c$ are related approximately as follows:

$$C_c/C_1 = \frac{N_2}{N_1} D$$

12. A tapped-inductor boost convertor according to claim 4 wherein said output filtering means has a time constant in a start mode $T_{F1}^s$, said second filter has a time constant in a run mode $T_{F2}^r$, and the values of which are selected to provide a low percentage ripple content in the lamp current during start and a high percentage ripple content in the lamp current during run.

13. A tapped-inductor boost converter according to claim 12 wherein said active switch comprises a MOSFET, and said controlling means for cyclically rendering said switch conductive and non-conductive varies said output voltage during the operation of said lamp from a relatively low voltage during start to a relatively high voltage during run.

14. A tapped-inductor boost converter according to claim 13 wherein the controlling means provides to said MOSFET a square-wave voltage signal at a predetermined switching frequency and a controlled duty ratio (D) which control said output voltage along with the output power provided to said lamp.

15. A tapped-inductor boost converter according to claim 10 wherein said output voltage is designated $V_O$ and said input voltage is designated $V_1$, and $V_O$, $V_1$, $N_1$, and $N_2$, and D are related to each other approximately as follows:

$$V_O/V_1 = (1+(N_2/N_1)D)/(1-D)$$

16. The tapped-inductor boost converter of claim 1 in which:
   (a) said gas discharge lamp has a relatively low resistance during start and a relatively high resistance during run,
   (b) said controlling means controls said active switch member so as to provide a relatively low output voltage during start and a relatively high output voltage during run,
   (c) said output filtering means constitutes a first output filter having a capacitive valve associated therewith that, in conjunction with the resistance of said lamp, provides first time constants during run and start,
   (d) a second filter comprising an inductance in series with said output terminals is provided so that said inductance, in conjunction with the resistance of said lamp, provides second time constants during run and start,
   (e) the ratio of said second time constant to said first time constant during start is relatively high compared to the ratio of said second time constant to said first time constant during run, thereby causing the percentage ripple content of the lamp current to be relatively low during start and relatively high during run.

17. In a tapped-inductor boost converter having a pair of input terminals connected to a power source capable of providing a DC input voltage thereto and a pair of output terminals for providing a gas discharge lamp an output voltage greater than or equal to the input voltage, said converter further comprises:
   an inductor comprising first and second windings and a tap between said windings;
   an active switch member connected to said tap;
   means for controlling and cyclically rendering said active switch conductive and non-conductive in a manner such that current flow through said first winding is effectively controlled thereby and further, such that said output voltage is also variably controlled thereby;
   a passive switch coupled to said inductor and effective such that, current through said second winding is controlled thereby;
   means for filtering said output voltage;
   clamping means cooperatively associated with said output filtering means and receptive of a signal which is proportionate to said output voltage, said clamping means being effective for clamping voltage across said active switch member, said clamping voltage being variable as a function of variations in said output voltage; and
   wherein said active switch is cyclically rendered conductive and non-conductive at a predetermined switching frequency and with a variable duty ratio D that determines said output voltage, said duty ration D being the portion of each cycle that said active switch is conductive.

* * * * *